(12) United States Patent
Dormehl et al.

(10) Patent No.: US 7,083,774 B2
(45) Date of Patent: Aug. 1, 2006

(54) PROCESS FOR THE PREPARATION OF VANADYL SULFATE SOLUTION

(75) Inventors: Andries Gerhardus Dormehl, Middleburg (ZA); Patrick Albert Monaghan, Witbank (ZA)

(73) Assignee: Highveld Steel and Vanadium Corporation Limited, Witbank (ZA)

( * ) Notice: Subject to any disclaimer, the term of this patent is extended or adjusted under 35 U.S.C. 154(b) by 0 days.

(21) Appl. No.: 10/516,372

(22) PCT Filed: May 26, 2003

(86) PCT No.: PCT/IB03/02002

§ 371 (c)(1),
(2), (4) Date: Jun. 1, 2005

(87) PCT Pub. No.: WO03/101893

PCT Pub. Date: Dec. 11, 2003

(65) Prior Publication Data

US 2005/0220898 A1    Oct. 6, 2005

(30) Foreign Application Priority Data

May 31, 2002  (ZA)  .................................. 2002/4382

(51) Int. Cl.
*C01G 31/00* (2006.01)
*C01B 17/96* (2006.01)

(52) U.S. Cl. ........................................ 423/544; 423/67
(58) Field of Classification Search ................ 423/544, 423/67

See application file for complete search history.

(56) References Cited

U.S. PATENT DOCUMENTS

| 4,913,885 A | * | 4/1990 | Seon et al. .................... 423/67 |
| 5,368,762 A |   | 11/1994 | Sato et al. |
| 6,613,298 B1 | * | 9/2003 | Tanaka et al. ................. 423/62 |
| 6,764,663 B1 | * | 7/2004 | Monaghan et al. ........... 423/62 |
| 6,872,376 B1 | * | 3/2005 | Tanaka et al. ............... 423/544 |

FOREIGN PATENT DOCUMENTS

WO    02/04353    1/2002

* cited by examiner

*Primary Examiner*—Stanley S. Silverman
*Assistant Examiner*—Ardith E. Hertzog
(74) *Attorney, Agent, or Firm*—Pauley Petersen & Erickson

(57) ABSTRACT

A process for producing a vanadyl sulphate solution (VOSO4) comprises forming a suspension of vanadium trioxide (V2O3) in a sulphuric acid solution and contacting the V2O3 suspension with a strong oxidising agent under controlled conditions to produce the VOSO4 solution. A preferred oxidising agent is hydrogen peroxide, which is added very slowly to the V2O3 suspension due to the violent nature of the reaction.

6 Claims, 2 Drawing Sheets

PROCESS FOR THE PREPARATION OF VANADYL SULFATE SOLUTION

BACKGROUND TO THE INVENTION

THIS invention relates to a process for the preparation of a vanadyl sulphate solution.

It is known to produce vanadyl sulphate by dissolving vanadium pentoxide in hot dilute sulphuric acid under vigorous agitation and continued heating with the aid of sulphur dioxide as a reducing agent.

The limited solubility of sulphur dioxide in acidic and aqueous solutions results in the emission of sulphur dioxide from the solution and this presents an environmental hazard. Overdosing of the solution with $SO_2$ gas results in the unwanted formation of the lower valent vanadium sulphate, namely $V_2SO_4$ and not vanadyl sulphate ($VOSO_4$).

Since the dissolution of vanadium pentoxide in sulphuric acid is endothermic heat has to be provided to drive the formation of vanadyl sulphate.

There is thus always a need for a new method for the production of vanadyl sulphate.

SUMMARY OF THE INVENTION

According to the invention a process for producing a vanadyl sulphate solution includes the steps of:
(1) providing a starting material comprising vanadium trioxide ($V_2O_3$);
(2) contacting the vanadium trioxide with an appropriate volume and concentration of a sulphuric acid solution to produce a vanadium trioxide suspension; and
(3) contacting the vanadium trioxide suspension with a strong oxidising agent that is capable of raising the valency or oxidation state of the vanadium, thereby to dissolve the vanadium trioxide in the sulphuric acid to produce the vanadyl sulphate solution ($VOSO_4$).

Various strong oxidising agents including peroxides and permanganate such as hydrogen peroxide, sodium peroxide and potassium permanganate, for example, can be used. Hydrogen peroxide is particularly preferred as it does not introduce any impurities into the final product.

The hydrogen peroxide is typically added slowly to the vanadium trioxide suspension due to the violent nature of the reaction.

BRIEF DESCRIPTION OF THE DRAWING

The invention will now be described in more detail, by way of example only, with reference to the accompanying drawings in which.

DESCRIPTION OF A PREFERRED EMBODIMENT

The crux of the invention is to use a strong oxidising agent to dissolve vanadium trioxide ($V_2O_3$), commonly referred to as Hivox, in a sulphuric acid solution to produce vanadyl sulphate ($VOSO_4$).

In carrying out the process, a strong oxidising agent such as a peroxide or permanganate, for example, is used to dissolve the $V_2O_3$ in a warm sulphuric acid solution with constant stirring. Although various strong oxidising agents such as hydrogen peroxide, sodium peroxide, potassium permanganate, iodine, potassium iodate, potassium bromate, bromine, ammonium persulfate, persulfates of sodium and potassium, cerium (IV) sulphate, and potassium dichromate, for example, can be used, hydrogen peroxide is preferred as it does not introduce any impurities into the final product.

Figure 1:
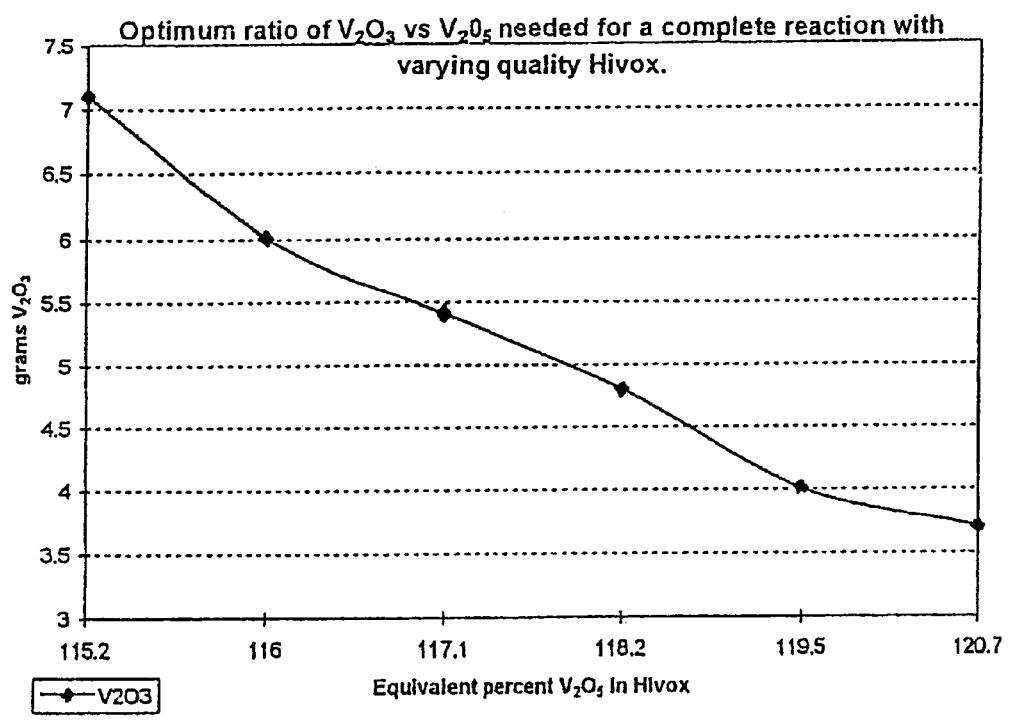
FIG. 1 is a graph indicating the mass relationship between varying quality $V_2O_3$ expressed as $V_2O_5$ against constant 4.5 g $V_2O_5$ portions in a 4.0 molar sulphuric acid solution.
Figure 2:
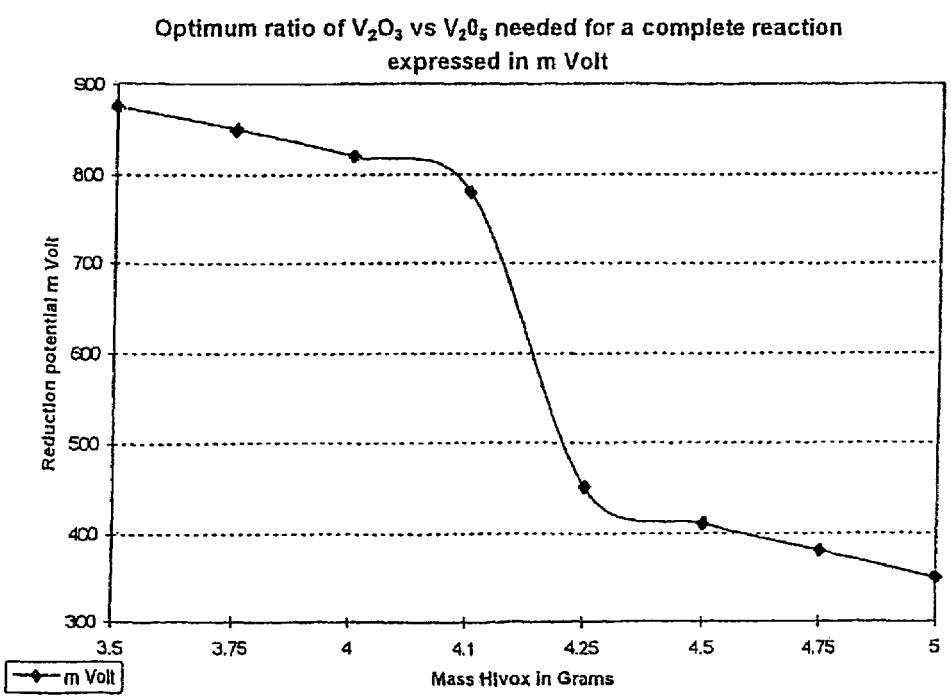
FIG. 2 indicates the reduction potential in mVolt against the mass of the $V_2O_3$ used.

As the quality of industrial grade Hivox ranges typically from 115 to 122 percent equivalent $V_2O_5$, FIG. 1 can be used in order to determine an appropriate quantity of $V_2O_3$ for use in the process, depending on the quality of the starting material used. The required solution can be obtained by monitoring the reduction potential thereof in mVolt, as shown in FIG. 2, during the dissolution process. The start of production of vanadyl sulphate is illustrated at the point where the graph dips sharply.

The invention will now be illustrated by way of the following non-limiting example.

EXAMPLE

Hydrogen peroxide was used to dissolve 3.0 grams Hivox ($V_2O_3$) in a warm (50° C.) 4.0 molar sulphuric acid solution with constant stirring. The hydrogen peroxide was added dropwise as it reacted violently with the solution. During the dissolution process the reduction potential of the solution was continuously monitored and the addition of hydrogen peroxide stopped when the solution reached the end point at 600 mVolts.

The process proceeded according to the following formula:

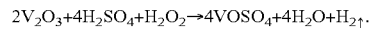

$$2V_2O_3 + 4H_2SO_4 + H_2O_2 \rightarrow 4VOSO_4 + 4H_2O + H_2\uparrow.$$

During the process, the solution first turned green, which is indicative of the presence of $V^{3+}$ ions, whereafter it turned blue, which is indicative of the presence of $VO^{2+}$ ions present in the vanadyl sulphate end product.

From the above, it is evident that vanadyl sulphate can readily be made using Hivox ($V_2O_3$), which is generally more cost effective, and less hazardous, than the conventional process using $V_2O_5$.

The invention claimed is:
1. A process for producing a vanadyl sulphate solution including the steps of:
   (1) providing a starting material comprising vanadium trioxide ($V_2O_3$);
   (2) contacting the vanadium trioxide with a sulphuric acid solution to produce a vanadium trioxide suspension; and
   (3) contacting the vanadium trioxide suspension with a strong oxidising agent, that is capable of raising the valency or oxidation state of the vanadium, thereby to dissolve the vanadium trioxide in the sulphuric acid to produce the vanadyl sulphate solution ($VOSO_4$).
2. A process according to claim 1, wherein the strong oxidising agent is selected from the group consisting of hydrogen peroxide, sodium peroxide, potassium permanganate, iodine, potassium iodate, potassium bromate, bromine, ammonium persulfate, persulfates of sodium and potassium, cerium (IV) sulphate, and potassium dichromate.
3. A process according to claim 2, wherein the strong oxidising agent is hydrogen peroxide.
4. A process according to claim 3, wherein the hydrogen peroxide is added dropwise to the vanadium trioxide suspension.

5. A process according to claim 4, wherein the addition of hydrogen peroxide is stopped when the reduction potential of the vanadium sulphate solution reaches a predetermined end point.

6. A process according to claim 5, wherein the end point is at about 600 mVolts.

* * * * *